(12) United States Patent
Pratt et al.

(10) Patent No.: US 10,815,820 B2
(45) Date of Patent: Oct. 27, 2020

(54) INTEGRAL SHEAR LOCKING BUMPER FOR GAS TURBINE ENGINE

(71) Applicant: United Technologies Corporation, Farmington, CT (US)

(72) Inventors: William S. Pratt, West Hartford, CT (US); Ryan M. Stanley, Quaker Hill, CT (US); Adam Hart, East Hampton, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 5 days.

(21) Appl. No.: 16/267,581

(22) Filed: Feb. 5, 2019

(65) Prior Publication Data

US 2020/0248579 A1    Aug. 6, 2020

(51) Int. Cl.
*F01D 17/16*     (2006.01)
*F01D 25/24*     (2006.01)
*F02C 9/20*      (2006.01)

(52) U.S. Cl.
CPC ......... *F01D 17/162* (2013.01); *F01D 25/243* (2013.01); *F01D 25/246* (2013.01);
(Continued)

(58) Field of Classification Search
CPC .... F01D 17/162; F01D 25/243; F01D 25/246; F02C 9/20; F05D 2260/50; F05D 2270/60
See application file for complete search history.

(56) References Cited

U.S. PATENT DOCUMENTS 4,812,106 A * 3/1989 Purgavie ............... F01D 17/162
                                                      415/139
4,925,364 A   5/1990 Das
(Continued)

FOREIGN PATENT DOCUMENTS

EP    1403467 A2    3/2004
EP    2481892 A2    8/2012
FR    2882577 A1    9/2006

OTHER PUBLICATIONS

Extended European Search Report for Application No. 19212333.9—1004; dated May 29, 2020; Report Received Date: Jun. 15, 2020; 6 pages.

*Primary Examiner* — Igor Kershteyn
(74) *Attorney, Agent, or Firm* — Cantor Colburn LLP (57) ABSTRACT

A synchronizing assembly including: a synchronizing ring having a countersunk orifice; and a bumper assembly comprising: a bumper at least partially enclosing a cavity, the bumper comprising an outward side, an inward side opposite the outward side, a first side extending between the outward side and the inward side, a first opening on the outward side extending into the bumper to define a first portion of the cavity; and a second opening on the first side extending into the bumper to define a second portion of the cavity; and a bolt comprising a bolt head and a bolt shank, wherein the bolt shank extends through the first opening and the bolt head is secured within the second portion of the cavity, wherein the bumper further comprises a raised boss extending away from the outward surface, the raised boss configured to mate with the countersunk orifice of the synchronizing ring.

18 Claims, 5 Drawing Sheets

(52) U.S. Cl.
CPC ............. *F02C 9/20* (2013.01); *F05B 2260/50* (2013.01); *F05B 2270/60* (2013.01)

(56) References Cited

U.S. PATENT DOCUMENTS

| | | | |
|---|---|---|---|
| 5,096,375 A * | 3/1992 | Ciokailo | F01D 11/22 415/127 |
| 5,387,080 A * | 2/1995 | Bouhennicha | F01D 17/162 415/150 |
| 6,884,025 B2 | 4/2005 | Pickens et al. | |
| 7,244,098 B2 | 7/2007 | Bromann | |
| 8,092,157 B2 * | 1/2012 | McCaffrey | F01D 17/162 415/160 |
| 8,794,910 B2 * | 8/2014 | Gasmen | F01D 25/243 415/160 |
| 8,864,450 B2 | 10/2014 | Gasmen et al. | |
| 9,353,644 B2 * | 5/2016 | LeBlanc | F01D 17/162 |
| 9,617,869 B2 | 4/2017 | Leblanc et al. | |
| 9,822,651 B2 * | 11/2017 | LeBlanc | F01D 17/162 |
| 2004/0062641 A1 * | 4/2004 | Pickens | F01D 17/16 415/160 |
| 2009/0285673 A1 * | 11/2009 | Giaimo | F01D 17/162 415/159 |

* cited by examiner

INTEGRAL SHEAR LOCKING BUMPER FOR GAS TURBINE ENGINE

STATEMENT OF FEDERAL SUPPORT

This invention was made with Government support awarded by the United States. The Government has certain rights in the invention.

BACKGROUND

The subject matter disclosed herein generally relates to gas turbine engines and, more particularly, to bumpers used between a synchronizing ring and a compressor case.

Some gas turbine engines utilize variable stator vanes that are actuated about their rotational axes to improve overall compressor characteristics. A synchronizing assembly is used to accurately control the position of the vanes. One type of synchronizing assembly includes a synchronizing ring that is controlled relative to a compressor case by actuators. Multiple bumpers are circumferentially arranged between the synchronizing ring and a compressor case to facilitate movement of the synchronizing ring throughout the changing clearances.

The bumpers may be bolted to the bottom of sync rings to ensure the stator vanes of a given axial set are all at the same angle and the bumpers run on designated runner pads on the case. The gap between the bumper and the case is tightly controlled and the smaller the gap the more accurate the position of the vanes, but the gap must be large enough to allow for movement sync ring relative to the case.

SUMMARY

According to an embodiment, a synchronizing assembly for a gas turbine engine is provided. The synchronizing assembly including: a synchronizing ring having a countersunk orifice; and a bumper assembly including: a bumper at least partially enclosing a cavity within the bumper, the bumper including an outward side, an inward side opposite the outward side, a first side extending between the outward side and the inward side, a first opening on the outward side extending into the bumper to define a first portion of the cavity; and a second opening on the first side extending into the bumper to define a second portion of the cavity; and a bolt having a first end and a second end opposite the first end, the bolt including a bolt head proximate the first end and a bolt shank proximate the second end, wherein the bolt shank extends through the first opening and the bolt head is secured within the second portion of the cavity, wherein the bumper further includes a raised boss extending away from the outward surface, the raised boss configured to mate with the countersunk orifice of the synchronizing ring.

In addition to one or more of the features described above, or as an alternative, further embodiments may include that the second opening is connected to the first opening proximate a vertex of the first side and the outward side at a connection plane located at a first distance away from the outward side.

In addition to one or more of the features described above, or as an alternative, further embodiments may include that the first side is a forward side of the bumper configured to be oriented towards a forward portion of the gas turbine engine.

In addition to one or more of the features described above, or as an alternative, further embodiments may include that a width of the bolt head is greater than a width of the first opening.

In addition to one or more of the features described above, or as an alternative, further embodiments may include that a width of the bolt head is greater than a width of the bolt shank.

In addition to one or more of the features described above, or as an alternative, further embodiments may include that the bolt shank is located within an opening in the synchronizing ring.

In addition to one or more of the features described above, or as an alternative, further embodiments may include: a fastening mechanism configured to secure the bumper assembly to the synchronizing ring via the bolt shank.

In addition to one or more of the features described above, or as an alternative, further embodiments may include that the raised boss is located proximate the first opening and the first opening extends through the raised boss.

In addition to one or more of the features described above, or as an alternative, further embodiments may include that the bolt shank includes a non-recessed portion and a recessed portion located proximate the first opening, the recessed portion having a width less than a width of the first opening.

According to another embodiment, a gas turbine engine is provided. The gas turbine engine including: a compressor section including a compressor case with at least one pad; at least one stage of variable stator vanes associated with the compressor section; and a synchronizing assembly including: a synchronizing ring have a countersunk orifice; and a bumper assembly including: a bumper at least partially enclosing a cavity within the bumper, the bumper including an outward side, an inward side opposite the outward side, a first side extending between the outward side and the inward side, a first opening on the outward side extending into the bumper to define a first portion of the cavity; and a second opening on the first side extending into the bumper to define a second portion of the cavity; and a bolt having a first end and a second end opposite the first end, the bolt including a bolt head proximate the first end and a bolt shank proximate the second end, wherein the bolt shank extends through the first opening and the bolt head is secured within the second portion of the cavity, wherein the bumper further includes a raised boss extending away from the outward surface, the raised boss configured to mate with the countersunk orifice of the synchronizing ring.

In addition to one or more of the features described above, or as an alternative, further embodiments may include that the second opening is connected to the first opening proximate a vertex of the first side and the outward side at a connection plane located at a first distance away from the outward side.

In addition to one or more of the features described above, or as an alternative, further embodiments may include that the first side is a forward side of the bumper configured to be oriented towards a forward portion of the gas turbine engine.

In addition to one or more of the features described above, or as an alternative, further embodiments may include that a width of the bolt head is greater than a width of the first opening.

In addition to one or more of the features described above, or as an alternative, further embodiments may include that a width of the bolt head is greater than a width of the bolt shank.

In addition to one or more of the features described above, or as an alternative, further embodiments may include that the bolt shank is located within an opening1 in the synchronizing ring.

In addition to one or more of the features described above, or as an alternative, further embodiments may include a fastening mechanism configured to secure the bumper assembly to the synchronizing ring via the bolt shank.

In addition to one or more of the features described above, or as an alternative, further embodiments may include that the raised boss is located proximate the first opening and the first opening extends through the raised boss.

In addition to one or more of the features described above, or as an alternative, further embodiments may include that the bolt shank includes a non-recessed portion and a recessed portion located proximate the first opening, the recessed portion having a width less than a width of the first opening.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Figure 1:
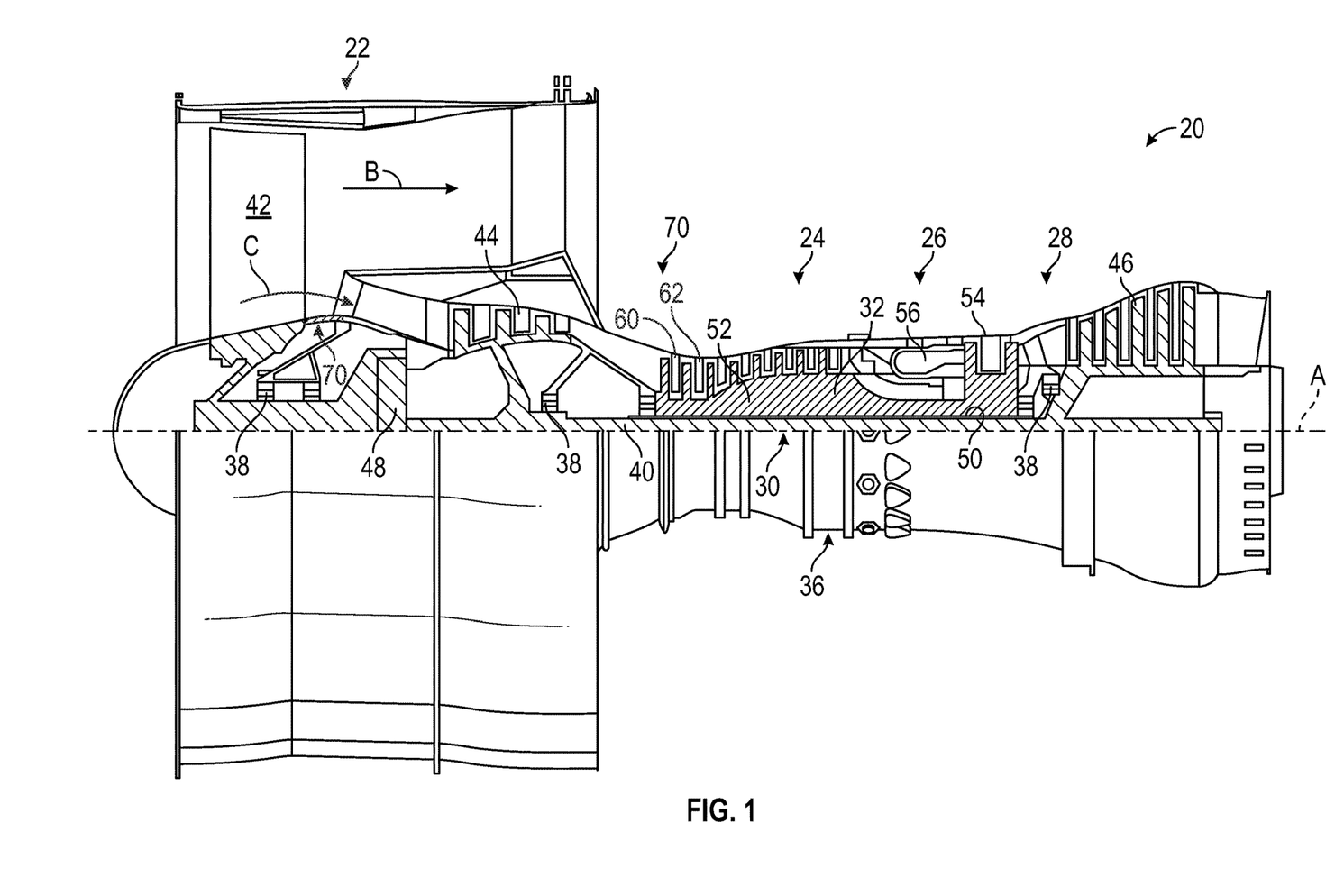
FIG. 1 is a partial cross-sectional illustration of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbine section 28 rotationally drives the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }°R)/(518.7°R)]^{0.5}$. The "Low corrected fan tip speed" as disclosed herein according to one non-limiting embodiment is less than about 1150 ft/second (350.5 m/sec).

With continued reference to FIG. 1, the engine 20 also includes a synchronizing assembly 70 including one or more variable area vane arrangements; e.g., vane arrangements 60, 62, etc. The vane arrangements directs gas for a respective engine section. In the illustrated example, the vane arrangement 60 guides and/or adjusts the flow of the core air into the compressor section 24. The vane arrangement 62 guides and/or adjusts the flow of the core air through the high pressure compressor 52; e.g., between adjacent high pressure compressor 52 stages.

Figure 2:
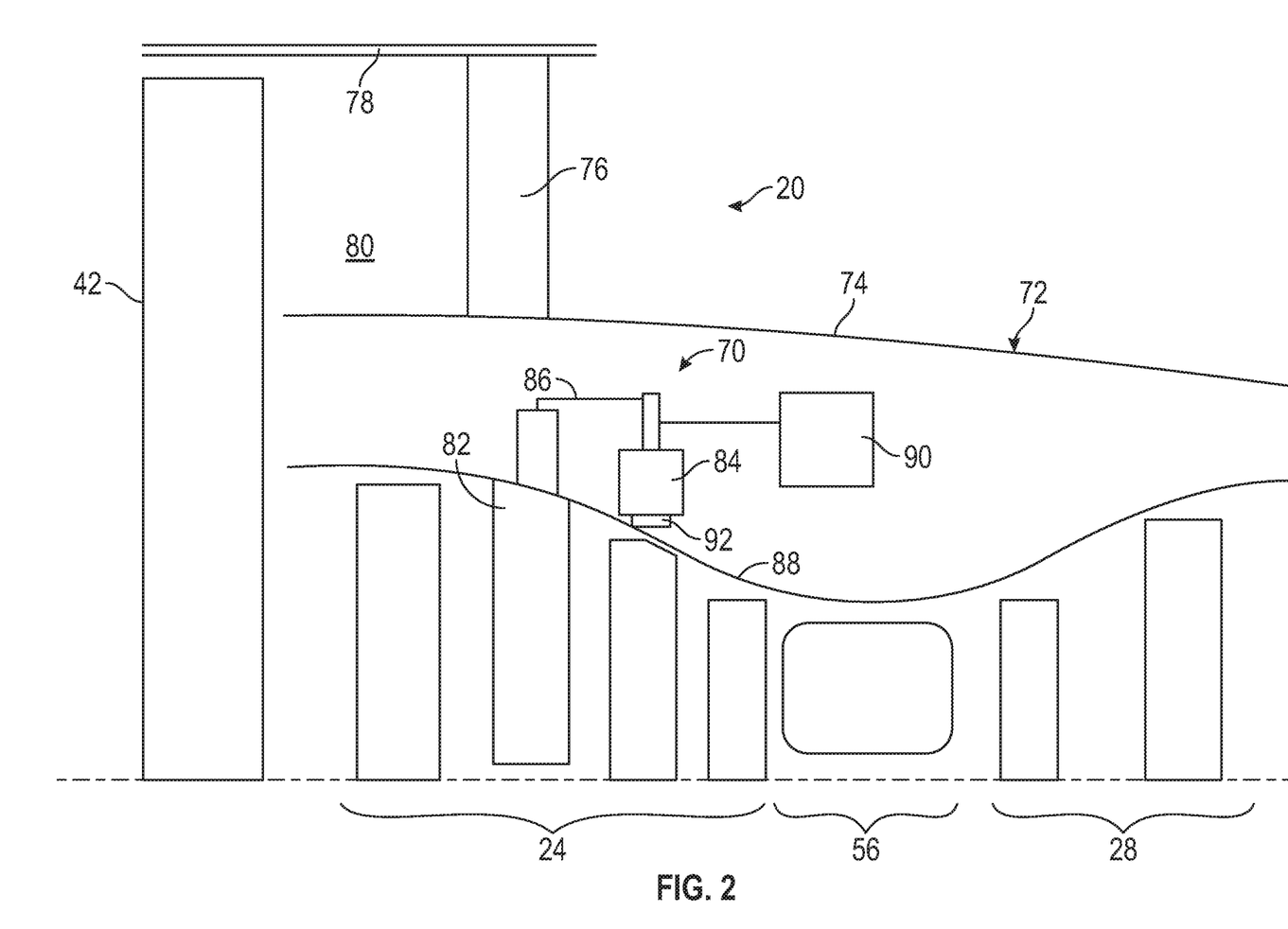
FIG. 2 is a schematic view of the example gas turbine engine with a synchronizing assembly, in accordance with an embodiment of the disclosure.
Figure 3:
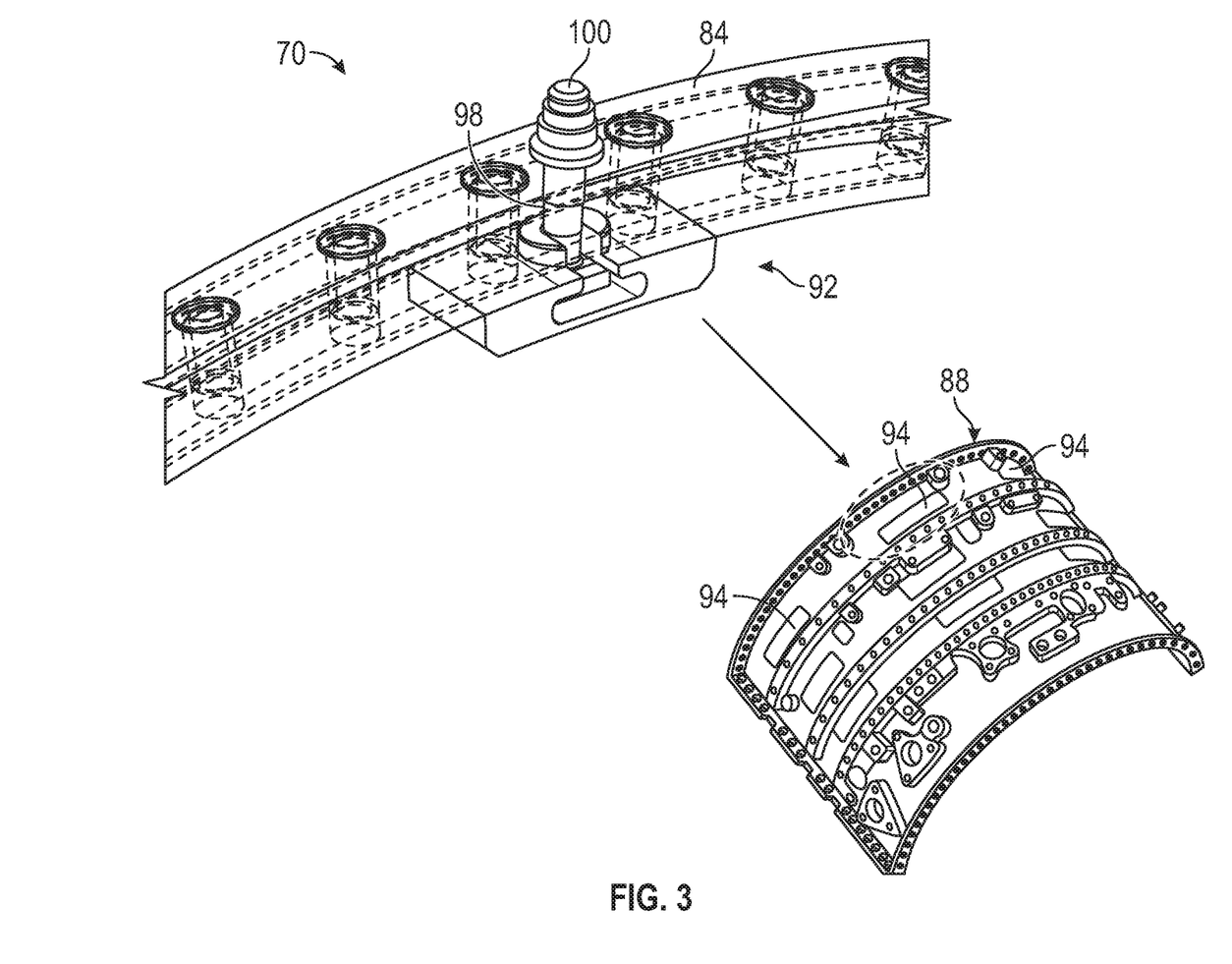
FIG. 3 is an exploded view of a portion of a synchronizing assembly and its corresponding compressor case, in accordance with an embodiment of the disclosure.

Referring now to FIGS. 2 and 3, with continued reference to FIG. 1, a schematic representation of a synchronizing assembly 70 for a variable vane structure as used in the gas turbine engine 20 is illustrated, in accordance with an embodiment of the present disclosure. The gas turbine engine 20 includes a core 72 having the compressor 24, combustor 56, and turbine section 28 which is housed within a core nacelle 74. The core 72 is supported relative to a fan case 78 by circumferentially arranged flow exit guide vanes 76. A fan duct 80 is provided between the fan case 78 and the core nacelle 74 and receives airflow from the fan 42.

In the example gas turbine engine 20, the compressor section 24 includes at least one stage of variable stator vanes 82 that are actuated by the synchronizing assembly 70 to rotate the vanes 82 about their respective axes to improve the overall efficiency of the compressor section 24.

The synchronizing assembly 70 includes a synchronizing ring 84 interconnected to the vanes 82 by arms 86. The synchronizing ring 84 is slidably mounted to a compressor case 88. An actuator 90 moves the synchronizing ring 84 in a generally axial and circumferential direction along an arcuate path to rotate the vanes 82. Bumper assemblies 92 are arranged circumferentially between the synchronizing ring 84 and the compressor case 88.

As illustrated in FIG. 3, the bumper assemblies 92 are supported on pads 94 circumferentially arranged on the exterior of the compressor case 88. Further, the ring 84 includes openings 98 that receive a bolt 100 used to secure the bumper assemblies 92 to the synchronizing ring 84.

Figure 4:
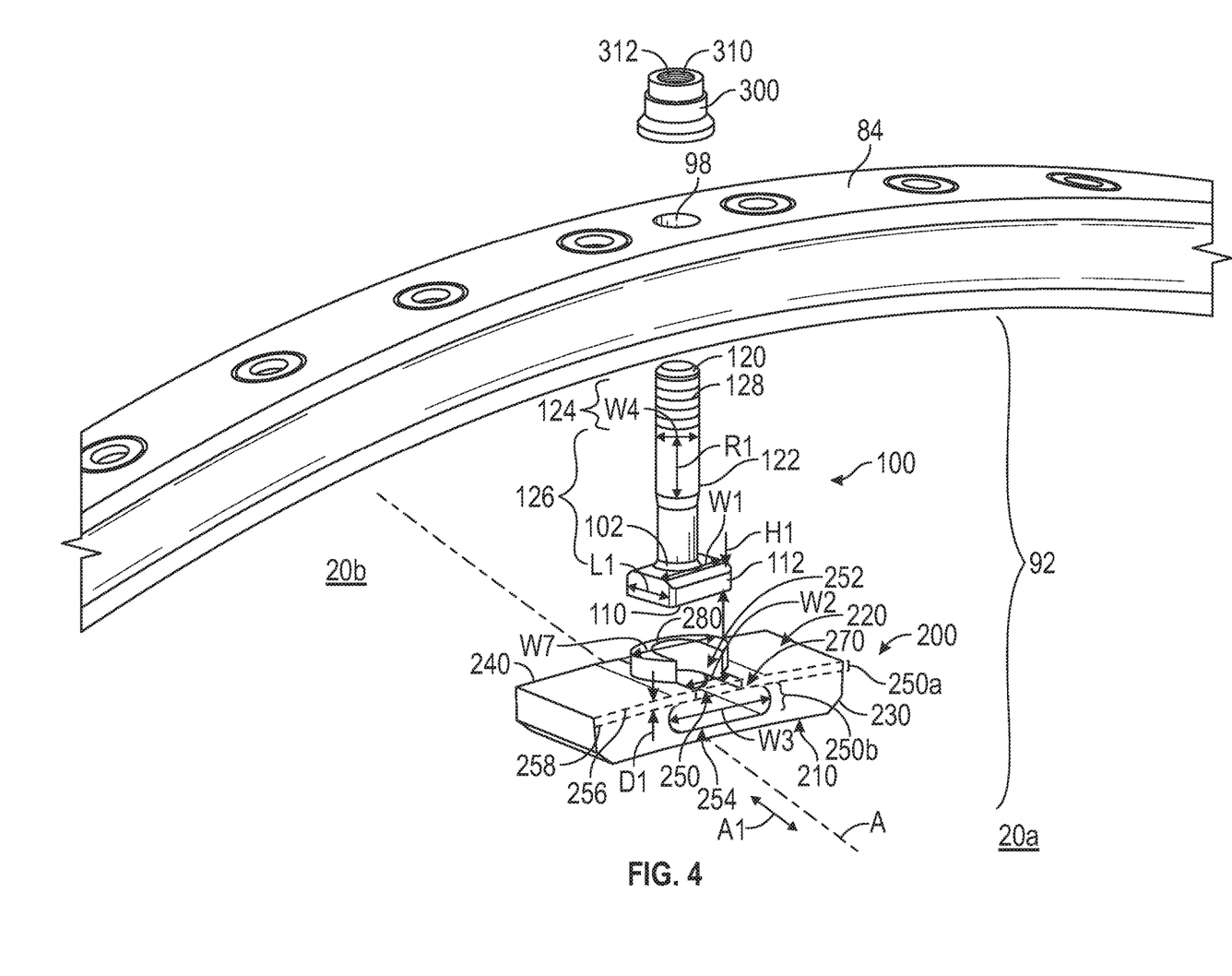
FIG. 4 is an exploded view of a bumper assembly of the synchronizing assembly of FIG. 3, in accordance with an embodiment of the disclosure.
Figure 5:
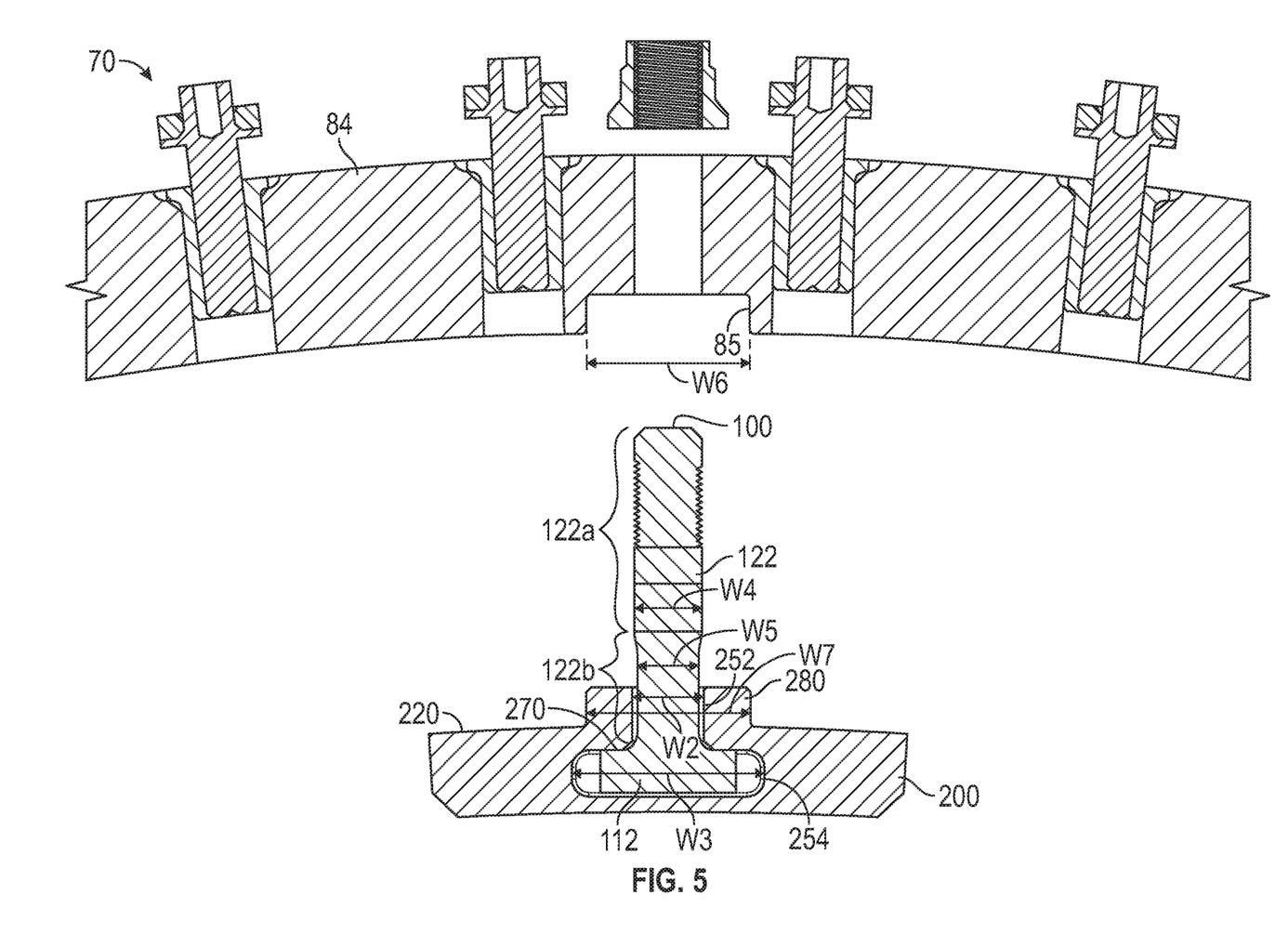
FIG. 5 is a cross-sectional view of a bumper assembly of the synchronizing assembly of FIG. 3, in accordance with an embodiment of the disclosure.

An example bumper assembly 92 is shown in FIGS. 4-5. The bumper assembly 92 includes a bolt 100 and a bumper 200. The bolt 100 includes a first end 110 and a second end 120 opposite the first end 110. The bolt 100 includes a bolt head 112 proximate the first end 110 and a bolt shank 122 proximate the second end 120. The bolt head 122 may be integrally attached to the bolt shank 122. In an embodiment, the bolt head 112 is rectangular or square in shape. However, the shape of the bolt head 112 is not limited to rectangular or square in shape and thus the bolt head 112 may have various shapes including, but not limited to, circular, oval, triangular, pentagonal, hexagonal, heptagonal, octagonal, etc. The bolt head 112 may extend from the first end 110 to an intermediate-point 102 interposed between the first end 110 and the second end 120. The bolt head 112 has a height H1 as shown, in FIG. 4. Depending on the shape of the bolt head 112, The bolt head 112 may also have at least one of a length L1 and a width W1. The bolt head 112 illustrated in FIG. 4 is rectangular in shape and thus includes a length L1 and a width W1. The length L1 of the bolt head 112 is oriented parallel with the engine central longitudinal axis A and the width W1 of the bolt head 112 may be oriented about perpendicular with the engine central longitudinal axis A. Depending upon the shape of the bolt head 112, the bolt head 112 may have various dimensions in various directions. For example, a circular bolt head may have a radius.

The bolt shank 122 is located proximate the second end 120 of the bolt 100 and extends from the intermediate-point 102 (i.e., the bolt head 112) to the second end 120. The bolt shank 122 may be cylindrical in shape as shown in FIG. 4. The bolt shank 122 has a width W4 (e.g., diameter). The width W1 of the bolt head 112 is greater than the width W4 of the bolt shank 122. The bolt shank 122 may include a threaded portion 124 proximate the second end 120 and a non-threaded portion 124 proximate the intermediate-point 102. The thread portion 124 includes external threads 128 configured to mesh with internal threads 312 located on an internal surface 310 of a fastening mechanism 300. The fastening mechanism 300 may be capable of being tightened (i.e., torqued) and loosened (i.e., untorqued) to allow for insertion of a shim between the bumper 200 and the synchronizing ring 84. The fastening mechanism 300 may be any fastening mechanism known to one of skill in the art. In an embodiment, the fastening mechanism 300 may be a nut. In an embodiment, the fastening mechanism may be a bolt having an allen wrench recess punched into the end of the bolt so that the bolt can be loosened and tightened. The bolt shank 122 is configured to be located within (i.e., inserted through) an opening 98 in the synchronizing ring 84. The fastening mechanism 300 secures the bumper assembly 92 to the synchronizing ring 84 via the bolt shank 122.

In one example, the bumper 200 is formed from a metallic material, for example; however other types of materials with low friction and good wear resistant characteristics could also be used. The bumper 200 includes an inward side 210 and an outward side 220 opposite the inward side 210. The inward side 210 is oriented radially inward towards the engine central longitudinal axis A of the gas turbine engine 20. The outward side 210 is oriented radially outward away from the engine central longitudinal axis A of the gas turbine engine 20. The inward side 210 abuts against the pad 94 on the compressor case 88. The bumper 200 also includes a forward side 230 and an aft side 240 opposite the forward side 230. The forward side 230 extends between the inward side 210 and the outward side 220. The aft side 240 extends between the inward side 210 and the outward side 220. The forward side 230 and the aft side 240 may be oriented about perpendicular to the engine central longitudinal axis A. The forward side 230 may be oriented towards a forward portion 20a of the gas turbine engine 20 (i.e., towards the inlet of the gas turbine engine 20) and the aft side 240 may be oriented towards an aft portion 20b of the gas turbine engine 20 (i.e., towards the outlet of the gas turbine engine 20).

The bumper 200 at least partially enclosing a cavity 250 within the bumper 200, as shown in FIG. 4. The cavity 250 includes a first opening 252 on the outward side 220 and a second opening 254 on at least one of the forward side 230 and the aft side 240. The first opening 252 extending into the bumper 200 to define a first portion 250a of the cavity 250 and the second opening 254 extending into the bumper 200 to define a second portion 250b of the cavity 250. In the illustrated embodiment shown in FIG. 4, the second opening 254 is located on the forward side 254, however the second opening 254 may be located on aft side 240 in other embodiments. The bolt shank 122 extends through the first opening 252.

The first opening 252 extends to the forward side 230, as shown in FIG. 4, thus the second opening 254 is connected to the first opening 252 proximate a vertex 256 of the forward side 230 and the outward side 220 at a connection plane 258 of the first opening 252 and the second opening 254. The connection plane 258 is located at a distance D1 away from the outward side 220. The connection of the first opening 252 and the second opening 254 allows the bolt 100 to be slide into the cavity 250 from the forward side 230 in an axial direction A1 parallel to the engine central longitudinal axis A of the gas turbine engine 20. The bolt head 112 is configured to fit within second portion 250b of the cavity 250. The bolt head 112 should be able to slide in and out of the cavity 250 freely, but once the bumper boss 280 is loaded into the a countersunk orifice 85, a small gap between a bottom of the bumper 210 and the compressor case 88 prevents the bolt 100 from escaping.

Referring now to FIGS. 4 and 5, with continued reference to FIGS. 1-3, a cross-sectional illustration of the synchronizing assembly 70 is illustrated in FIG. 5, in accordance with an embodiment of the present disclosure. As shown in FIGS. 4-5, the first opening 252 has a width W2 and the second opening 254 has a width W3 greater than the width W2 of the first opening 252. Since the width W2 of the first opening 252 is less than the width W3 of the second opening 254, a lip 270 is formed between the outward side 220 and the connection plane 258. The lip 270 is configured to secure the head 112 of the bolt 100 within the second portion 250b of cavity 250 in the radial direction R1.

The width W3 of the second opening 254 is larger than the width W1 of the bolt head 112, such that a loose fit is provided between the bolt head 112 and the second opening 254 of the cavity 250. The bolt shank 122 has a width W4 at a non-recessed portion 122a but is reduced to a recessed width W5 proximate the first opening 252 at a recess portion 122b of the bolt shank 122. The recessed width W5 of the recessed portion 122b of the bolt shank 122 is less than the width W4 of the non-recessed portion 122a of the bolt shank 122. The width W2 of the first opening 252 is larger than the recessed width W5 of the recessed portion 122b of the bolt shank 122, such that a loose fit is provided between the recessed portion 122b of the bolt shank 122 and the first opening 252 of the cavity 250.

The bumper 200 further comprises a raised boss 280 extending away from the outward surface 220. The raised boss 280 is configured to mate within a countersunk orifice 85 of the synchronizing ring 84. The raised boss 280 is located proximate the first opening 252 and the first opening 252 extends through the raised boss 280. A width W6 of the countersunk orifice 85 is about equivalent to or slightly larger than a width W7 of the raised boss 280, such that a snug fit is provided between the raised boss 280 and the countersunk orifice 85. Advantageously, the snug fit between the raised boss 280 and the countersunk orifice 85 and the loose between the recessed portion 122b of the bolt shank and the first opening 252 helps transmit shear due to friction during transient motion from the bumper 200 to the ring 84 without putting the bolt 100 in bending. Advantageously, the bolt 100 may not experience any bending load at all due to the snug fit between the raised boss 280 and the countersunk orifice 85 is much tighter than the loose fit between the recessed portion 122b of the bolt shank 122 and the first opening 252 of the cavity 250, so the bolt 100 may never touch the bumper 200 except at the lip 270.

Technical effects of embodiments of the present disclosure include eliminating bending in the bolt of a bumper assemblies by transferring the axial load of the bumper assembly through a raised boss of a bumper to a countersunk orifice of a synchronizing ring.

The term "about" is intended to include the degree of error associated with measurement of the particular quantity based upon the equipment available at the time of filing the application. For example, "about" can include a non-limiting range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:
1. A synchronizing assembly for a gas turbine engine comprising:
 a synchronizing ring having a countersunk orifice; and
 a bumper assembly comprising:
  a bumper at least partially enclosing a cavity within the bumper, the bumper comprising an outward side, an inward side opposite the outward side, a first side extending between the outward side and the inward side, a first opening on the outward side extending into the bumper to define a first portion of the cavity; and a second opening on the first side extending into the bumper to define a second portion of the cavity; and
  a bolt having a first end and a second end opposite the first end, the bolt comprising a bolt head proximate the first end and a bolt shank proximate the second end, wherein the bolt shank extends through the first opening and the bolt head is secured within the second portion of the cavity,
 wherein the bumper further comprises a raised boss extending away from the outward surface, the raised boss configured to mate with the countersunk orifice of the synchronizing ring.
2. The synchronizing assembly of claim 1, wherein the second opening is connected to the first opening proximate a vertex of the first side and the outward side at a connection plane located at a first distance away from the outward side.

3. The synchronizing assembly of claim 1, wherein the first side is a forward side of the bumper configured to be oriented towards a forward portion of the gas turbine engine.

4. The synchronizing assembly of claim 1, wherein a width of the bolt head is greater than a width of the first opening.

5. The synchronizing assembly of claim 1, wherein a width of the bolt head is greater than a width of the bolt shank.

6. The synchronizing assembly of claim 1, wherein the bolt shank is located within an opening in the synchronizing ring.

7. The synchronizing assembly of claim 6, further comprising: a fastening mechanism configured to secure the bumper assembly to the synchronizing ring via the bolt shank.

8. The synchronizing assembly of claim 1, wherein the raised boss is located proximate the first opening and the first opening extends through the raised boss.

9. The synchronizing assembly of claim 1, wherein the bolt shank includes a non-recessed portion and a recessed portion located proximate the first opening, the recessed portion having a width less than a width of the first opening.

10. A gas turbine engine comprising:
- a compressor section including a compressor case with at least one pad;
- at least one stage of variable stator vanes associated with the compressor section; and
- a synchronizing assembly comprising:
  - a synchronizing ring have a countersunk orifice; and
  - a bumper assembly comprising:
    - a bumper at least partially enclosing a cavity within the bumper, the bumper comprising an outward side, an inward side opposite the outward side, a first side extending between the outward side and the inward side, a first opening on the outward side extending into the bumper to define a first portion of the cavity; and a second opening on the first side extending into the bumper to define a second portion of the cavity; and
  - a bolt having a first end and a second end opposite the first end, the bolt comprising a bolt head proximate the first end and a bolt shank proximate the second end, wherein the bolt shank extends through the first opening and the bolt head is secured within the second portion of the cavity,
  wherein the bumper further comprises a raised boss extending away from the outward surface, the raised boss configured to mate with the countersunk orifice of the synchronizing ring.

11. The gas turbine engine of claim 10, wherein the second opening is connected to the first opening proximate a vertex of the first side and the outward side at a connection plane located at a first distance away from the outward side.

12. The gas turbine engine of claim 10, wherein the first side is a forward side of the bumper configured to be oriented towards a forward portion of the gas turbine engine.

13. The gas turbine engine of claim 10, wherein a width of the bolt head is greater than a width of the first opening.

14. The gas turbine engine of claim 10, wherein a width of the bolt head is greater than a width of the bolt shank.

15. The gas turbine engine of claim 10, wherein the bolt shank is located within an opening1 in the synchronizing ring.

16. The gas turbine engine of claim 15, further comprising: a fastening mechanism configured to secure the bumper assembly to the synchronizing ring via the bolt shank.

17. The gas turbine engine of claim 10, wherein the raised boss is located proximate the first opening and the first opening extends through the raised boss.

18. The gas turbine engine of claim 10, wherein the bolt shank includes a non-recessed portion and a recessed portion located proximate the first opening, the recessed portion having a width less than a width of the first opening.

* * * * *